United States Patent
Kraenzel et al.

(10) Patent No.: US 8,122,095 B2
(45) Date of Patent: *Feb. 21, 2012

(54) SYSTEM AND METHOD FOR EXTRACTING AND MANAGING MESSAGE ADDRESSES

(75) Inventors: Carl J. Kraenzel, Boston, MA (US);
Paul B. Moody, Hyde Park, VT (US);
Daniel M. Gruen, Newton, MA (US);
Christof Lucking, Chelmsford, MA (US); Jodi L. Coppinger, Merrimack, NH (US)

(73) Assignee: International Business Machines Corporation, Armonk, NY (US)

( * ) Notice: Subject to any disclaimer, the term of this patent is extended or adjusted under 35 U.S.C. 154(b) by 85 days.

This patent is subject to a terminal disclaimer.

(21) Appl. No.: 12/757,823

(22) Filed: Apr. 9, 2010

(65) Prior Publication Data

US 2010/0199177 A1    Aug. 5, 2010

Related U.S. Application Data

(63) Continuation of application No. 10/745,499, filed on Dec. 29, 2003, now Pat. No. 7,747,690.

(51) Int. Cl.
*G06F 15/16* (2006.01)

(52) U.S. Cl. ......... 709/206; 709/203; 709/217; 715/205

(58) Field of Classification Search .................. 709/203, 709/206, 217, 223; 715/205
See application file for complete search history.

(56) References Cited

U.S. PATENT DOCUMENTS

| | | | |
|---|---|---|---|
| 5,805,911 A | 9/1998 | Miller | 395/796 |
| 5,864,340 A | 1/1999 | Bertram et al. | 345/352 |
| 6,088,700 A | 7/2000 | Larsen et al. | 707/10 |
| 6,192,380 B1 | 2/2001 | Light et al. | 707/505 |
| 6,208,339 B1 * | 3/2001 | Atlas et al. | 715/205 |
| 6,298,128 B1 | 10/2001 | Ramey et al. | 379/142.01 |
| 6,349,299 B1 | 2/2002 | Spencer et al. | 707/10 |
| 6,353,852 B1 | 3/2002 | Nestoriak, III et al. | 709/206 |
| 6,442,591 B1 | 8/2002 | Haynes et al. | 709/206 |
| 6,507,866 B1 | 1/2003 | Barchi | 709/207 |
| 6,651,217 B1 | 11/2003 | Kennedy et al. | 715/507 |
| 6,829,607 B1 | 12/2004 | Tafoya et al. | 707/6 |
| 6,839,744 B1 | 1/2005 | Kloba et al. | 709/219 |
| 7,016,700 B2 | 3/2006 | Takahashi et al. | 455/550.1 |
| 7,062,534 B1 | 6/2006 | Henry et al. | 709/206 |
| 7,181,497 B1 * | 2/2007 | Appelman et al. | 709/206 |
| 7,475,113 B2 * | 1/2009 | Stolze | 709/206 |
| 7,747,690 B2 | 6/2010 | Kraenzel et al. | 709/206 |
| 7,953,804 B2 * | 5/2011 | Van Belle et al. | 709/206 |
| 7,958,197 B2 * | 6/2011 | Hughes et al. | 709/206 |
| 2002/0140727 A1 | 10/2002 | Lindholm | 345/744 |
| 2003/0135490 A1 | 7/2003 | Barrett et al. | 707/3 |
| 2004/0215726 A1 | 10/2004 | Arning et al. | 709/206 |
| 2005/0198144 A1 | 9/2005 | Kraenzel et al. | 709/206 |
| 2006/0242109 A1 * | 10/2006 | Pereira et al. | 707/1 |

* cited by examiner

*Primary Examiner* — Ramy M Osman
(74) *Attorney, Agent, or Firm* — Pillsbury Winthrop Shaw Pittman LLP (57) ABSTRACT

A system and method is disclosed for extracting and maintaining in a virtual address book one or more electronic mail addresses from one or more of the various address fields (e.g., "From," "To," "Cc," "Bcc") of one or more e-mail messages either transmitted from or received at a predetermined network node (e.g., a client or server). Electronic mail addresses stored in the virtual address book may be made available to "auto-complete" capabilities utilized during the addressing of electronic mail messages.

20 Claims, 4 Drawing Sheets

From: Sally.Sample@abc.com
To: Amy Apple; ddavis@acme.org
Cc:
Bcc: Sent: Mon. 12/1/2003, 2:06pm.

Subject: Dinner

Hi Girls. How about dinner on Friday night?
Let me know!!

From: Bob Bartlett
To: Amy Apple; Sally Sample
Cc: Jdoe@consult.com
Bcc: Received: Tues. 12/2/2003, 9:24am.

Subject: Client Meeting

Sally/Amy –
I just spoke with John Doe and he is available to meet with our client on Wed. at 3:00pm.
Bob

FIG. 2B

Virtual Address Book for <u>SALLY SAMPLE</u>: Sally.Sample@abc.com    As of: Fri. 12/5/2003, 11:59pm.

| 420 User Name | 430 E-mail Address | 440 Recently Sent To | 450 Frequently Sent To | 460 Recently Received | 470 Frequently Received From | 480 Shared Thread With | 490 Participated in Thread With |
|---|---|---|---|---|---|---|---|
| Apple, Amy | Amy.Apple@abc.com | Mon. 12/1/2003, 2:06pm. | 1 | | | 0 | 0 |
| Bartlett, Bob | Bob.Bartlett@abc.com | | | Tues. 12/2/2003, 9:24am. | 1 | 0 | 0 |
| Davis, Donna | ddavis@acme.org | Mon. 12/1/2003, 2:06pm. | 1 | | | 0 | 0 |
| Doe, John | Jdoe@consult.com | | | | | 0 | 0 |

FIG. 2C

VIEW 600

Filter e-mail addresses in Virtual Address Book by: 610

630 — ☐ Recently Sent To: -- within [2] Days ← 640

☐ Frequently Sent To: -- if more than [10] Messages

620 — [X] Recently Received: -- within [5] Days

☐ Frequently Received From -- if more than [5] Messages

☐ Shared Thread With

☐ Participated in Thread With

[ SUBMIT ] ← 650

Display Filtered E-mail Addresses: 680

| Name: | E-mail Address: |
|---|---|
| Bartlett, Bob | Bob.Bartlett@abc.com |

SYSTEM AND METHOD FOR EXTRACTING AND MANAGING MESSAGE ADDRESSES

This application is a continuation of U.S. patent application Ser. No. 10/745,499, filed Dec. 29, 2003 now U.S. Pat. No. 7,747,690.

FIELD OF THE INVENTION

The invention relates generally to electronic mail systems, and more particularly to a system and method for extracting and maintaining in a virtual address book one or more electronic mail addresses from one or more of the various address fields (e.g., "From," "To," "Cc," "Bcc") of one or more e-mail messages either transmitted from or received at a predetermined network node (e.g., a client or server). Electronic mail addresses stored in the virtual address book may be made available to "auto-complete" capabilities utilized during the addressing of electronic mail messages.

BACKGROUND OF THE INVENTION

Many conventional electronic mail ("e-mail") systems enable users to store a plurality of e-mail addresses in an "address book" (or directory) together with a corresponding name for each e-mail address listed. In this regard, when composing an e-mail message to one or more individuals, a user may select the name or names of intended recipients from the address book without having to input their entire e-mail address.

Although many users may realize a time-saving benefit from address book features when addressing e-mail messages, the process of actually storing names and corresponding e-mail addresses into address books of current e-mail systems can be quite time-consuming. For example, many address books (of current e-mail systems) require users to manually enter the name and e-mail address for each individual, which may be tedious if a user has numerous names and e-mail addresses to input and store.

Alternatively, some e-mail systems enable a user to select (e.g., "right-click" on) a single e-mail address in an address field (e.g., "From," "To," "Cc," "Bcc") of an e-mail message and then further select to have that address added to his or her address book. While this process may be somewhat quicker than manually entering names and e-mail addresses, it still relies on a user having to select each individual e-mail address, one at a time, for storage in an address book.

Another drawback associated with current e-mail systems is the apparent lack of "auto-complete" capabilities for automatically completing a name and/or e-mail address that a user has begun to type, particularly if the name or e-mail address is not stored in their address book.

Still yet another disadvantage of many current e-mail systems is that user address books are often stored on a central server. This may prevent users from accessing their address book if they failed to download their address book (to their remote client terminal) prior to commencing work off-line. These and other drawbacks exist.

SUMMARY OF THE INVENTION

The invention solving these and other problems relates to a system and method for extracting (and maintaining in a virtual address book) one or more electronic mail ("e-mail") addresses from one or more of the various address fields (e.g., "From," "To," "Cc," "Bcc") of one or more e-mail messages either transmitted from or received at a predetermined network node (e.g., a client or server). In one embodiment, all e-mail addresses listed from all of the address fields of any e-mail messages either transmitted from or received at a predetermined network node are extracted and stored in a virtual address book.

According to an embodiment of the invention, each extracted e-mail address from each e-mail message may be stored in a memory buffer. Those addresses stored in the memory buffer may then be compared with e-mail addresses (if any) stored in a user's address book to determine whether the extracted e-mail addresses are already stored in the user address book.

If an extracted e-mail address is not already stored in the user address book, then an additional comparison may be made to determine whether the e-mail address is stored in a virtual address book. If the e-mail address is not stored in the virtual address book, then a new record may be created for the e-mail address in the virtual address book and populated with various data fields.

According to an embodiment of the invention, if an extracted e-mail address in the memory buffer is already stored in the user address book, then one or more fields in the virtual address book corresponding to the record for the e-mail address may be updated. If an extracted e-mail address in the memory buffer is not stored in the user address book, but is already stored in the virtual address book, then one or more fields in the virtual address book corresponding to the record for the e-mail address may be updated.

According to one embodiment, each record in the virtual address book may comprise a "user name" field, "e-mail address" field, "recently sent to" field, "frequently sent to" field, "recently received" field, "frequently received from" field, "shared thread with" field, and "participated in thread with" field. Other fields may be present.

The "user name" field and "E-mail address" field may include the respective names and e-mail addresses extracted from the address fields of one or more (or all) outgoing and incoming e-mail messages.

For messages sent from a user at a remote client (e.g., an outgoing e-mail message) to a particular recipient, the "recently sent to" field in the virtual address book may be populated with the date and/or time of the latest message that was sent to that particular recipient. The "frequently sent to" field may represent an accruing total of the number of messages sent to a particular recipient. For the first e-mail message sent to a particular recipient, the "frequently sent to" field may have an initial value of 1. This value may increase by an increment of 1 with each successive message sent to that recipient.

For messages addressed to a user and received at a remote client (e.g., an incoming e-mail message), the "recently received" field in the virtual address book may be populated with the date and/or time of the latest message that was received from a particular sender. The "frequently received from" field may represent an accruing total of the number of messages received from a particular sender. For the first e-mail message received from a sender, the "frequently received from" field may have an initial value of 1. This value may increase by an increment of 1 with each successive message received from that sender.

According to an embodiment of the invention, if transmitted or received e-mail messages are part of a conversation thread, then the "shared thread with" field may be populated by a thread id with a value of 1, where 0=false, and 1=true. The "participated in thread with" field may also be populated by a thread id with a value of 1, where 0=false, and 1=true. Other indicators may be used.

According to an embodiment of the invention, a graphical user interface (GUI) may be provided to enable a user to generate a customized, filtered list of e-mail addresses taken from those stored in the virtual address book. In one embodiment, user-selectable filters for generating the list may comprise one or more of the above-referenced fields comprising each record in the virtual address book.

According to one embodiment, the invention (as disclosed herein) may enable the addressing of e-mail messages through the auto-completion of names, based on the data in the various fields of each record in the virtual address book For example, a user may compose an e-mail message intended for one or more recipients. When the user is ready to address the e-mail message, he or she may begin to input the name of an intended recipient in any of the "From," "To," "Cc," "Bcc" or other address fields. As the user begins to input characters, an auto-completion module or process may search the virtual address book for potential matches and, when a match has been identified, auto-complete the remainder of the name for the user, or provide a listing of probable matches for the user to select from.

Given the likelihood that a virtual address book may comprise a notable number of records, and that there are a plurality of ways in which a user may begin to input a name or e-mail address (by first name, last name, etc.), it may not be uncommon for the auto-completion module or process to identify a plurality of potential or probable matches in the virtual address book.

Accordingly, in one implementation, a GUI may enable a user to customize and/or modify priority rules that may govern the auto-completion module or process when identifying and/or determining probable matches for e-mail addresses being entered by the user. A display may, for example, comprise an ordered list including a single item matching one or more of the fields listed in the virtual address book ("user name" field, "e-mail address" field, "recently sent to" field, "frequently sent to" field, "recently received" field, "frequently received from" field, "shared thread with" field, and "participated in thread with" field) together with various user-selectable tools or selection portions for reordering this list. According to an embodiment, a user may order the fields in the list such that certain fields are assigned a higher priority (e.g., considered more important to the user) when the auto-completion module or process determines probable matches.

One advantage of the invention is that e-mail addresses may, without requiring any action on the part of a user, be extracted from one or more of the various address fields (e.g., "From," "To," "Cc," "Bcc") of one or more e-mail messages, either transmitted from or received at a predetermined network node (e.g., a client or server), and maintained in a virtual address book that may accessible by the user.

Another advantage of the invention is that a graphical user interface (GUI) may be provided to enable a user to generate a customized, filtered list of e-mail addresses from those stored in the virtual address book, and to manipulate one or more of the addresses stored in the virtual address book according to personal preference.

Still yet another advantage of the invention is that electronic mail addresses stored in the virtual address book may be made available to convenient and user-customizable "auto-complete" capabilities utilized during the addressing of electronic mail messages.

Yet another advantage of the invention is that, in one implementation, the virtual address book may be stored on a user's remote client such that e-mail addresses and "auto-complete" addressing capabilities may still be available to the user when he or she is working off-line.

These and other objects, features, and advantages of the invention will be apparent through the detailed description of the preferred embodiments and the drawings attached hereto. It is also to be understood that both the foregoing general description and the following detailed description are exemplary and not restrictive of the scope of the invention.

DETAILED DESCRIPTION OF PREFERRED EMBODIMENTS

Figure 1:
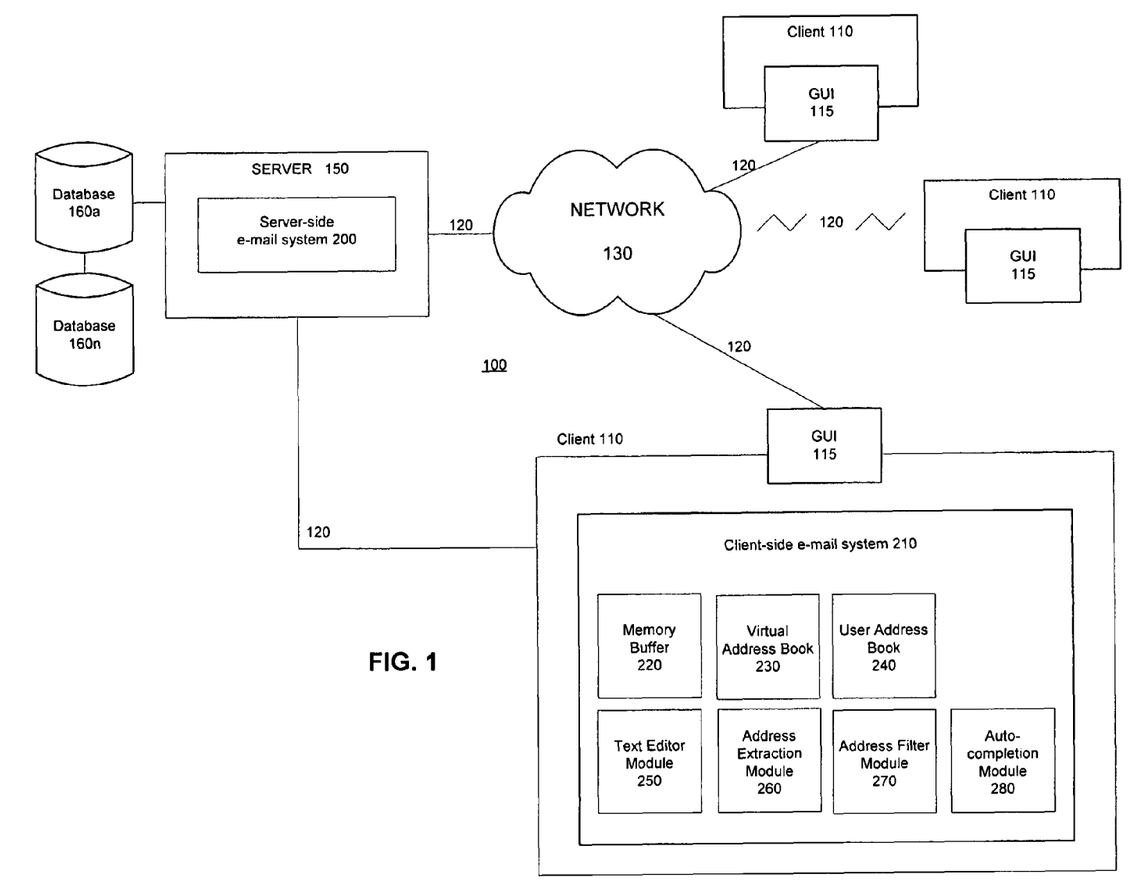
FIG. 1 is a schematic diagram of a system for extracting and managing electronic mail messages, according to an embodiment of the invention.

According to an embodiment of the invention illustrated in FIG. 1, a system 100 is provided for extracting (and maintaining in a virtual address book) one or more electronic mail ("e-mail") addresses from one or more of the various address fields (e.g., "From," "To," "Cc," "Bcc") of one or more e-mail messages either transmitted from or received at a predetermined network node (e.g., a client or server). In certain embodiments, all e-mail addresses listed from all of the address fields of all e-mail messages either transmitted from or received at a predetermined network node are extracted and stored in a virtual address book (described in detail below). Moreover, in various embodiments, e-mail addresses stored in the virtual address book may be made available to "auto-complete" capabilities afforded by the invention, as described in greater detail below.

According to an embodiment of the invention, an e-mail system is provided comprising a server-side e-mail system 200 that may be stored on, loaded on to, or operated by a server 150, and a client-side e-mail system 210 that may be stored on, loaded on to, or operated by a remote client 110. According to one embodiment of the invention, the e-mail system described herein may comprise a stand-alone e-mail system. Alternatively, the e-mail system may be incorporated into a number of products relating to e-mail, instant messaging, discussion forums, or other multi-part communication systems or platforms. As an exemplary illustration, one or more of the features and functionality of the e-mail system described herein may be incorporated into the Lotus Workplace™ 2.0 platform.

According to an embodiment, server 150 may be or include, for instance, a workstation running Microsoft Windows™ NT™, Microsoft Windows™ 2000, Unix, Linux, Xenix, IBM, AIX™, Hewlett-Packard UX™, Novell Netware™, Sun Microsystems Solaris™, OS/2™, BeOS™, Mach, Apache, OpenStep™, or other operating system or platform. According to an embodiment of the invention, server-side e-mail system 200 may perform various functions including processing and routing e-mail messages, as well as managing administrative tasks relating to security and the creation and maintenance of user e-mail accounts. Additional, typical server-side e-mail capabilities and/or functionality may be enabled by server-side e-mail system 200, as known and understood by those having skill in the art.

Additionally, as illustrated in FIG. 1, one or more data sources 160a-160n may be operatively connected to server 150 and/or server-side e-mail system 200, and may be used to store e-mail messages, user e-mail account information, or other information. Data sources 160a-460n may comprise any combination of databases and other data storage or query formats, platforms, or resources. Examples of databases may include the Oracle™ relational database sold commercially by Oracle Corporation, as well as Informix™ and DB2 (Database 2). Other databases may also be used. Examples of additional data storage or query formats, platforms, or resources, may include a knowledge management (KM) repository, a search engine, OLAP (On Line Analytical Processing), SQL (Standard Query Language), a SAN (storage area network), and Microsoft Access™. Other data sources may also be used, incorporated, or accessed into the invention.

According to an embodiment of the invention, one or more remote clients 110 may be networked directly to server 150, or connected over a network 130 to server 150 via a communications link 120.

Client 110 may comprise, for example, a personal computer, portable computer, workstation, dumb terminal, PDA (personal digital assistant), Blackberry,™ Palm Pilot,™ web-enabled mobile phone, or other computer device that may be used to send, receive, or access e-mail messages.

Network 130 may include any one or more of, for instance, the Internet, an intranet, a PAN (Personal Area Network), a LAN (Local Area Network), a WAN (Wide Area Network), a SAN (Storage Area Network), or a MAN (Metropolitan Area Network).

Communications link 120 may include any one or more of, for instance, a copper telephone line, a Digital Subscriber Line (DSL) connection, a Digital Data Service (DDS) connection, an Ethernet connection, an Integrated Services Digital Network (ISDN) line, an analog modem connection, a cable modem connection, or a wireless connection.

According to an embodiment of the invention, client-side e-mail system 210 may serve as a "front-end," enabling a user at client 110 to read, compose, or send e-mail messages, organize e-mail messages (both sent and received) in various folders and/or sub-folders, maintain address books, launch programs to view e-mail message attachments, and access additional e-mail features and functionality, as known and understood by those having skill in the art. In operation, one or more users may access the various features and functionality enabled by client-side e-mail system 210 (and server-side e-mail system 200) through an interface 115. According to an embodiment of the invention, interface 115 may comprise a graphical user interface (GUI).

As illustrated in FIG. 1, client-side e-mail system 210 may further comprise one or more data storage structures, such as a memory buffer 220, a virtual address book 230, and a user address book 240, as well as one or more modules including a text editor module 250, address extraction module 260, address filter module 270, and auto-completion module 280. Each of the foregoing data storage structures and modules (described in greater detail below) may implement the various features and functions of the invention as described herein. Additional modules and data storage structures (not illustrated) may be provided. One or more of the modules or data storage structures comprising client-side e-mail system 210 may be combined. For some purposes, not all modules or data storage structures may be necessary.

Those having skill in the art will appreciate that the invention described herein may work with various system configurations. Accordingly, although one or more of the foregoing data storage structures and modules may be described herein as a part of client-side e-mail system 210, it should be recognized that, in various embodiments, one or more of memory buffer 220, virtual address book 230, user address book 240, text editor module 250, address extraction module 260, address filter module 270, and auto-completion module 280 may comprise server-side e-mail system 200. As such, the embodiments described herein should not be viewed as limiting.

According to an embodiment of the invention, a user at client 110 may, via GUI 115, view, reply to, and/or forward received e-mail messages, compose and edit outgoing e-mail messages, run a spell-check feature, insert attachments, and utilize various other standard e-mail features as known and understood by those having skill in the art. In one or more implementations; text editor module 250 may enable one or more of these features.

According to an embodiment of the invention, address extraction module 260 may extract one or more e-mail addresses from one or more of the various address fields of one or more e-mail messages either transmitted from or received at client 110, and store them in memory buffer 220. Examples of e-mail address fields include the "From," "To," "Cc," and "Bcc" fields. Other address fields may be used. In one embodiment, address extraction module 260 may extract every e-mail address from every address field of every e-mail message either transmitted from or received at client 110, for storage in memory buffer 220.

Address extraction module 260 may then compare each extracted e-mail address stored in memory buffer 220 with the e-mail addresses (if any) stored in a user address book 240. This comparison determines whether or not the extracted e-mail addresses are already stored in user address book 240.

If an extracted e-mail address is not already stored in user address book 240, then a comparison may be made to determine whether or not the e-mail address is stored in virtual address book 230. If the e-mail address is not stored in virtual address book 230, then a new record may be created for the e-mail address in virtual address book 230 and populated with various data fields.

Figure 2A:
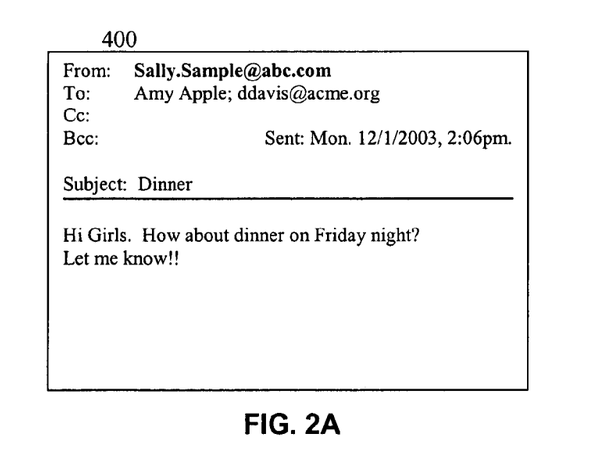
FIGS. 2A-2C illustrate an example of how various records of a virtual address book may be populated, according to an embodiment of the invention.
Figure 2B:
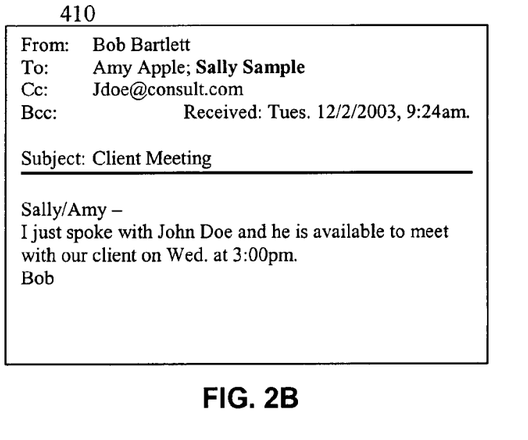
Figure 2C:
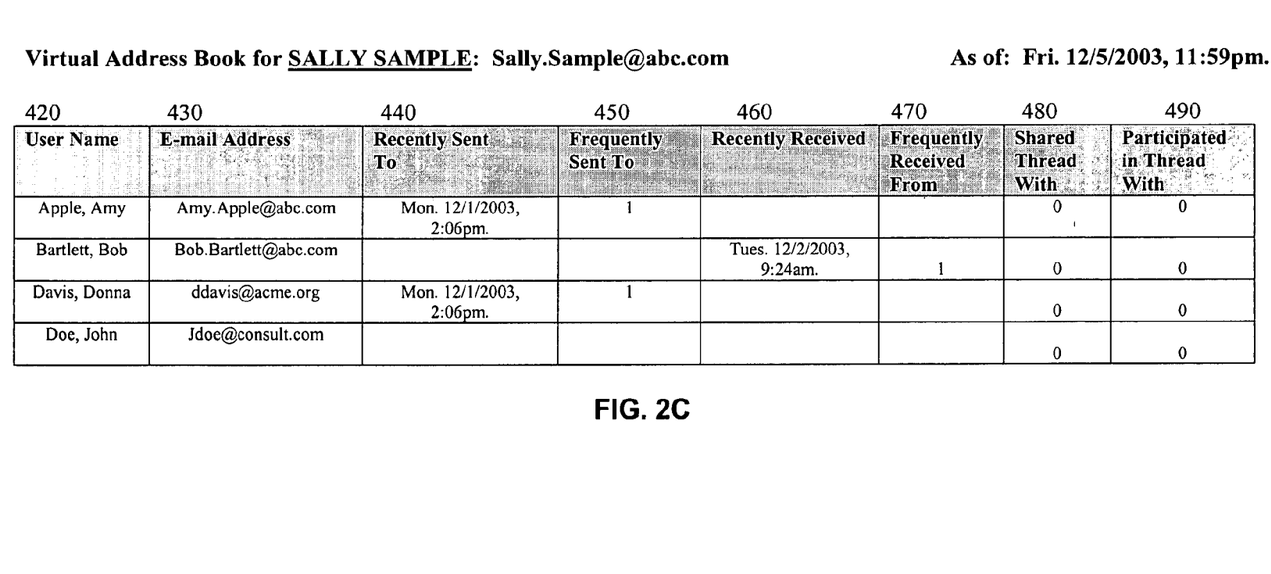

As an exemplary illustration, FIGS. 2A-2C depict how records of virtual address book 230 for a fictitious user, "Sally Sample," may be populated. In particular, FIG. 2A illustrates a sample outgoing e-mail message 400 from Sally Sample to two recipients, while FIG. 2B illustrates a sample incoming e-mail message 410 of which Sally Sample is a recipient. FIG. 2C depicts how records of virtual address book 230 for Sally Sample may be populated based on these two e-mail messages (400, 410).

According to one embodiment, and with reference to FIG. 2C, each record listed in virtual address book 230 may comprise a "user name" field 420, "e-mail address" field 430, "recently sent to" field 440, "frequently sent to" field 450, "recently received" field 460, "frequently received from" field 470, "shared thread with" field 480, and "participated in thread with" field 490. Other fields may be present.

According to an embodiment of the invention, "user name" field 420 may be populated with a 'user name' parsed from an SMTP Originator field, "From" field, "in reply to" fields, "To" field, "Cc" field, "Bcc" field, or other fields. "E-mail address" field 430 may be populated from the e-mail portion of the SMTP Originator field, "From" field, "in reply to" fields, "To" field, "Cc" field, "Bcc" field, or other fields. As shown in FIG. 2C, "user name" field 420 and "E-mail address" field 430 include the respective names and e-mail addresses extracted from the address fields of outgoing e-mail message 400 and incoming e-mail message 410.

For messages sent from a user at client 110 (e.g., outgoing e-mail message 400), to a particular recipient, "recently sent to" field 440 in virtual address book 230 may be populated with the date and/or time of the latest message that was sent to that particular recipient. "Frequently sent to" field 450 may represent an accruing total of the number of messages sent to a particular recipient. For the first e-mail message to a recipient, "frequently sent to" field 450 may have an initial value of 1. This value may increase by an increment of 1 with each successive message sent to that recipient. As shown in outgoing e-mail message 400, for example, both "Amy Apple" and "Donna Davis" were addressees (or recipients) of the message that was sent at 2:06 pm. on Monday Dec. 1, 2003. As such, the "recently sent to" field 440 for each is populated with this information, and assuming that this is the first e-mail messages that Sally Sample has sent to both Amy Apple and Donna Davis, the "frequently sent to" field 450 is assigned an initial value of 1.

For messages addressed to a user and received at client 110 (e.g., incoming e-mail message 410) by a user, "recently received" field 460 in virtual address book 230 may be populated with the date and/or time of the latest message that was received by the user. "Frequently received from" field 470 may represent an accruing total of the number of messages received from a particular sender. For the first e-mail message received from a sender, "frequently received from" field 470 may have an initial value of 1. This value may increase by an increment of 1 with each successive message received from that sender. As shown in incoming e-mail message 410, for example, "Bob Bartlett" was the sender of the message which was received at 9:24 am. on Tuesday Dec. 2, 2003. As such, the "recently received" field 460 for Bob Bartlett is populated with this information, and assuming that this is the first e-mail message that Sally Sample received from Bob Bartlett, the "frequently received from" field 470 is assigned an initial value of 1.

According to an embodiment of the invention, if transmitted or received e-mail messages are part of a conversation thread, then "shared thread with" field 480 may be populated by a thread id with a value of 1, where 0=false, and 1=true. "Participated in thread with" field 490 may also be populated by a thread id with a value of 1, where 0=false, and 1=true. Other indicators may be used. As illustrated in the example in FIG. 2C, "shared thread with" field 480 and "participated in thread with" field 490 have values of "0," as neither outgoing e-mail message 400 nor incoming e-mail message 410 are part of a conversation thread in this example.

According to an embodiment of the invention, if it is determined that an extracted e-mail address stored in memory buffer 220 is already stored in user address book 240, then one or more fields in virtual address book 230 (as described in detail above) corresponding to the record for the e-mail address may be updated.

For example, for an incoming message received from a particular sender listed in user address book 240, the "recently received" field 460 in virtual address book 230 may be updated to include the date/time information for when the incoming e-mail message was received, and the "frequently received from" field 470 may increased by an increment of 1.

Likewise, for an outgoing e-mail message sent by a user to one or more recipients, the "recently sent to" field 440 in virtual address book 230 may be updated to include the date/time information for when the outgoing e-mail message was sent, and the "frequently sent to" field 450 may be increased by an increment of 1.

It should be recognized that, although the extracted e-mail address matches an e-mail address already stored in user address book 240, it is the record for the address in virtual address book 230 that may be updated or otherwise modified. Although user address book 240 may not include all of the e-mail addresses listed in a virtual address book 230, virtual address book 230 may (in one embodiment) include each e-mail address listed in user address book 240. This is because a user may only wish to have certain e-mail addresses listed in his or her user address book 240, while virtual address book 230 may (in certain embodiments) include a much larger list of each and every e-mail address ever extracted from each and every address field of each and every e-mail message either transmitted from or received at client 110. The advantages of having such a comprehensive virtual address book 230 will be described in greater detail below.

According to one embodiment, a user may choose to manually add an e-mail address to user address book 240 even though he or she has yet to send an e-mail message to that address, or yet to receive an e-mail message in which that address has been listed as a recipient. In such an instance, any new e-mail addresses added to user address book 240 may automatically have a corresponding record created in virtual address book 230.

According to an embodiment of the invention, if it is determined that an extracted e-mail address stored in memory buffer 220 is not stored in user address book 240 but is already stored in virtual address book 230, then one or more fields in virtual address book 230 corresponding to the record for the e-mail address may be updated, as described above.

According to an embodiment of the invention, and as recited above, one or more users may access the various features and functionality enabled by server-side e-mail system 200 and client-side e-mail system 210 through various views (which may be referred to herein as screen-shots, displays, windows, etc.) via GUI 115.

Figure 3:
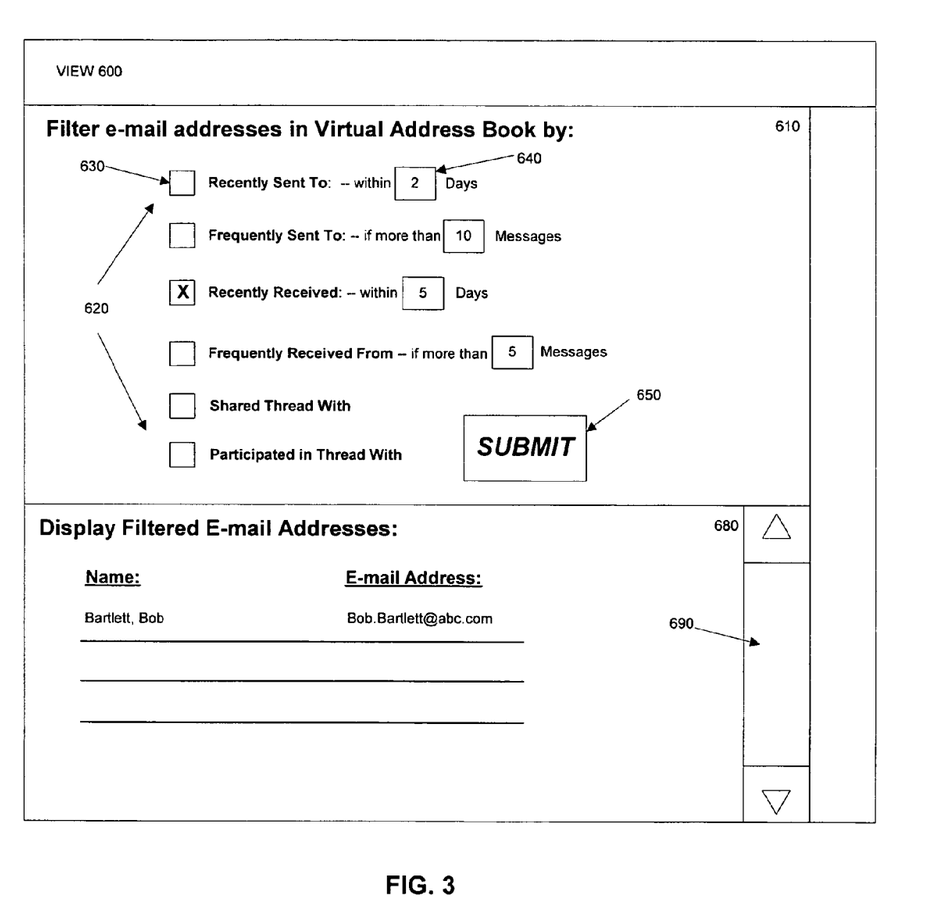
FIG. 3 is an example of a view that may be presented to a user, according to an embodiment of the invention.

FIG. 3 is an example of a view 600 that may be presented to a user, according to an embodiment of the invention. It should be understood that view 600, which is described in detail below, is exemplary and may differ in appearance, content, and configuration in various embodiments of the invention. Further, and as may be described herein, terms such as "button," "pull-down menu," "tab," "click-box," "check-box," "hypertext link," and "hot link," are each particular examples of a generic "selection portion" which may comprise any known navigational tool that enables users to select, access, display, or navigate through the content made available to users in view 600. The selection portions may be accessed using any known input device associated with client 110 such as, for example, a keyboard, computer mouse, light stylus instrument, or finger or other body part in a touch-screen implementation. Moreover, while a selection portion may be described and illustrated as a check-box in one embodiment, it could comprise a different selection portion (e.g., a button or a drop-down menu) in an alternative embodiment.

As illustrated in view 600, an array of filters 620 may be provided in window display 610 to enable a user to sort through one or more of the e-mail addresses stored in virtual address book 230 (FIG. 1). In one implementation, filter array 620 may comprise a list of one or more of the various fields associated with each user name and/or e-mail address stored in virtual address book 230 including, for example, "recently sent to" field, "frequently sent to" field, "recently received" field, "frequently received from" field, "shared thread with" field, and the "participated in thread with" field.

A check-box 630 or other selection portion may also be associated with each field to enable a user to select a particular field as the basis for a filtered e-mail address search of virtual address book 230. One or more of the fields may also have an associated text-input box 640 or other selection portion for enabling a user to specify various parameters for the filtered search. For example, a user may wish to filter virtual address book 230 to generate a list of all e-mail addresses to which they had recently sent a message within the last 2 days. A user could also vary the filter to generate a list of all e-mail addresses to which they had recently sent a message within the last 1 day, the last 3 days, the last 5 days, or other predetermined time interval (e.g., by minutes, hours, weeks, months, etc.) that they choose to input in text-input box 640.

View 600 illustrates an example wherein a user has selected to filter the e-mail addresses of virtual address book 230 by generating a list of all e-mail addresses from which they had recently received an e-mail message within the previous 5 days. To execute the filtering process (or search), a user may select the desired field from filter array 620, specify parameters where applicable via text-input box 640, and select a "submit" selection portion 650 to generate the list. In one embodiment, a filtered list of e-mail addresses may be provided in window display 680. In those instances wherein a plurality of e-mail addresses may be generated as a result of a filtering process, a scroll bar 690 or other scrolling mechanism may be provided to enable a user to quickly analyze and view each of the e-mail addresses comprising the filtered list.

Additionally, although not illustrated, view 600 may further include various selection portions for enabling a user to execute a number of processes enabled by client-side e-mail system 210 and/or server side e-mail system 200. For example, in one embodiment, a user may edit e-mail addresses in virtual address book 230 by manually adding, removing, or modifying any of the fields in each e-mail address record. A user may also select any number of e-mail addresses (using conventional mechanisms for accumulating selections in a list) for subsequent use in the addressing of new or existing outgoing e-mail messages.

Moreover, a user may choose to add any address from virtual address book 230 to their user address book 240, if the address is not already stored in user address book 240.

According to an embodiment of the invention, auto-completion module 280 (as illustrated in FIG. 1) may enable the addressing of e-mail messages through the auto-completion of names, based on the data in the various fields of each record in virtual address book 230. For example, a user may, compose an e-mail message intended for one or more recipients. When the user is ready to address the e-mail message, he or she may begin to input the name of an intended recipient in any of the "From," "To," "Cc," "Bcc" or other address fields. As the user begins to input characters, auto-completion module 280 may search virtual address book 230 for potential matches and, when a match has been identified, auto-complete the remainder of the name for the user.

As an illustrative example, assume an entry has been created in a user's virtual address book for the name "George Jacobs." When a user begins to address an e-mail message to George Jacobs, he may begin to input the name "Jacobs" one letter at a time: J, a, c, etc. As the user is inputting the name, auto-completion module 280 may search virtual address book 230 for names beginning with "J, a, etc." and auto-complete the name for the user in the address field when the name "Jacobs, George" has been identified as the probable match.

Of course, in various embodiments, names may be listed in virtual address book 230 beginning with either the first or last name, and a user may of course begin typing with either the first name (e.g., George) or last name (e.g., Jacobs) of the intended recipient. As such, auto-completion module 280 may be configured to search for probable matches based on first name and/or last name. Moreover, a user may also begin to enter an e-mail address in one of the address fields. Accordingly, auto-completion module 280 may further be configured to search for probable matches based on comparisons with the e-mail address field in virtual address book 230.

Given the various number of ways in which a user may begin to input a name or e-mail address, it may not be uncommon for auto-completion module 280 to identify a plurality of potential or probable matches in virtual address book 230. For instance, a user may wish to send an e-mail message to a recipient named "David Smith." Upon inputting the name "David" one letter at a time: D, a, v, etc., the auto-completion module 280 may identify the following user names and/or e-mail addresses in virtual address book 230 as probable matches:

Davey@wxyz.com

Davidson, Mark

David Smith

Davis, Donna

Davenport@companyABC.org

According to one embodiment, a pop-up window or view may appear displaying each of the probable matches for the user. A user may scroll or otherwise browse through the list of matches and select the desired (or intended) e-mail address.

Alternatively, according to one implementation, view 600 (FIG. 3) may comprise an additional priority rule window display (not illustrated) for enabling a user to customize and/or modify priority rules to be followed by auto-completion module 280 when determining probable matches for e-mail addresses being entered by the user. It should be recognized that the priority rule window display may, in an alternative embodiment, comprise a unique view separate from, but accessible through, view 600. Other configurations may exist.

According to an embodiment of the invention, priority rule window display may comprise an ordered list including a single item matching one or more of the fields listed in virtual address book 230 ("user name" field, "e-mail address" field, "recently sent to" field, "frequently sent to" field, "recently received" field, "frequently received from" field, "shared thread with" field, and "participated in thread with" field) together with various user selection portions for reordering this list. According to an embodiment, a user may order the fields in the list such that certain fields are assigned a higher priority (e.g., considered more important to the user) when auto-completion module 280 determines probable matches.

With reference back to the "David Smith" example described above, the user may have selected the "frequently sent to" field in the priority rule window display as being the highest priority field for auto-completion. As such, if the user frequently sends e-mail messages to David Smith, then the "frequently sent to" field in the record for David Smith in the user's virtual address book may have a high value. As such, when the user begins to input the name "David" one letter at a time (e.g., D, a, v, . . . ) in the address field, auto-completion module 280 may first analyze values for the "frequently sent to" field for names in the virtual address book comprising "D, a, v" and as such, may auto-complete the name "David Smith," or return it at the top of a probable match list that is presented to the user.

Figure 4:
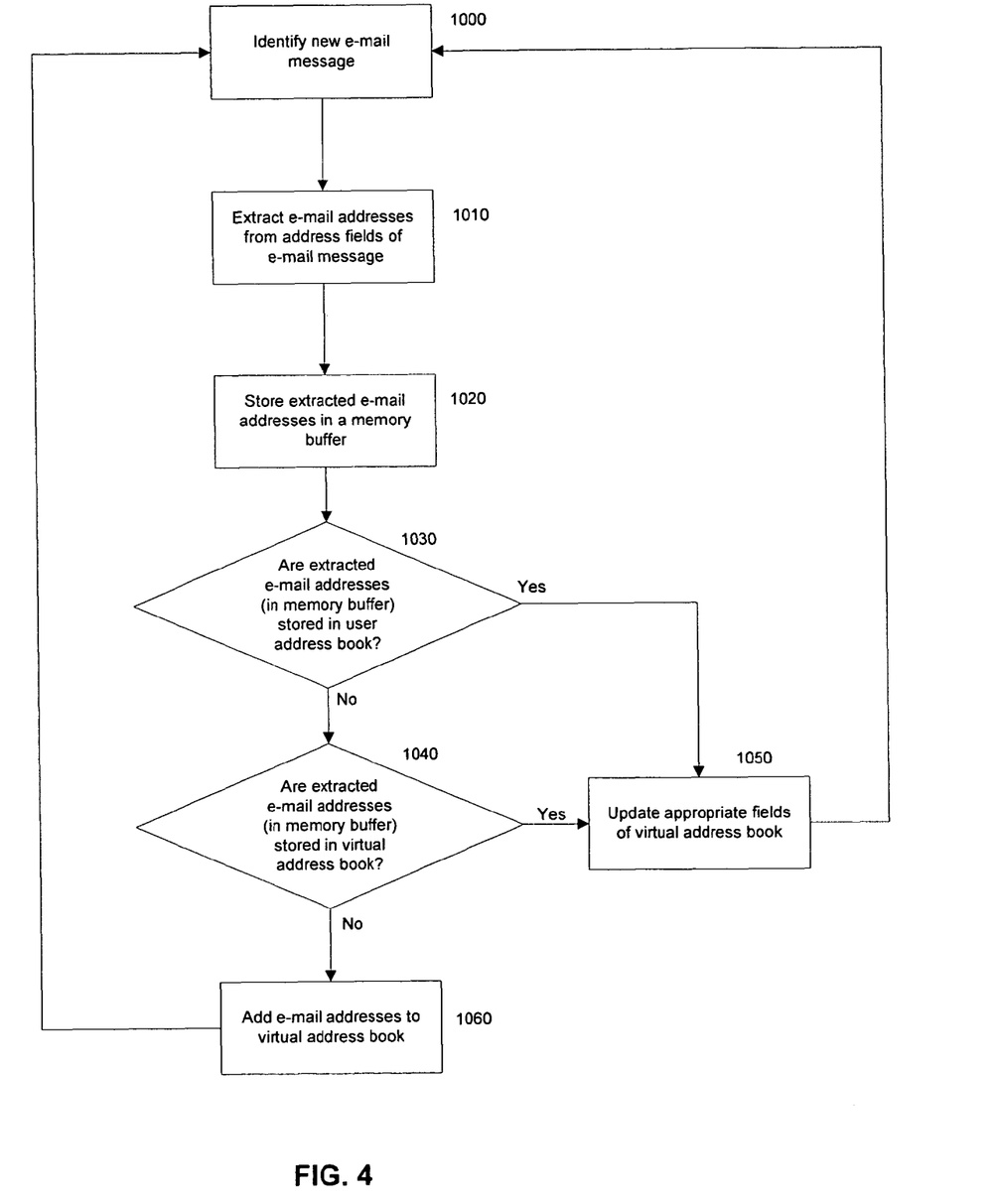
FIG. 4 illustrates a flowchart of processing, according to the invention, in one regard.

In addition to the foregoing description, FIG. 4 illustrates a flowchart of processing for extracting and managing electronic mail messages, according to the invention, in one regard. The following operations may be accomplished using all or some of the of the system components described in detail above, and may incorporate all of the features and functionality of the invention as set forth in the foregoing description and accompanying drawing figures.

In an operation 1000, an e-mail message may be identified. The e-mail message may comprise a message that has either been transmitted from or received at a predetermined network node (e.g., a client or server).

In an operation 1010, one or more e-mail addresses from one or more of the various address fields (e.g., "From," "To," "Cc," or "Bcc" fields) of the identified e-mail message may be extracted and, in an operation 1020, stored in a memory buffer. In one embodiment, every e-mail address from every address field of the identified e-mail message may be extracted for storage in the memory buffer.

In an operation 1030, each extracted e-mail address stored in the memory buffer may be compared with e-mail addresses (if any) stored in a user address book to determine whether or not the extracted e-mail addresses are already stored in the user address book. If a determination is made in operation 1030 that an extracted e-mail address is not already stored in the user address book, then a comparison may be made, in an operation 1040, to determine whether the e-mail address is stored in a virtual address book. If it is determined that the e-mail address is not stored in the virtual address book, then a new record may be created for the e-mail address in virtual address book, in an operation 1060, and populated with various data fields.

According to an embodiment of the invention, if it is determined in operation 1030 that an extracted e-mail address stored in the memory buffer is already stored in the user address book, then one or more fields in the virtual address book corresponding to the record for the e-mail address may be updated in an operation 1050.

According to an embodiment of the invention, if it is determined in operation 1040 that an extracted e-mail address stored in the memory buffer is not stored in the user address book but is already stored in the virtual address book, then one or more fields in the virtual address book corresponding to the record for the e-mail address may be updated in operation 1050.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer-implemented method for facilitating auto-completion of text in an address field of electronic mail addresses, the method comprising:
   storing, within a non-transitory computer readable storage medium, a virtual address book comprising records for electronic mail addresses, the records comprising a plurality of fields, the plurality of fields including:
      i) an electronic mail address;
      ii) a name associated with the electronic mail address; and
      iii) information regarding prior interaction with the electronic mail address;
   receiving a request from a user, via a user interface, to establish a priority rule for ordering records, wherein establishing the priority rule includes receiving a selection from the user of at least one field corresponding to the information regarding prior interaction with the electronic mail address for which a higher priority is assigned to for ordering records;
   storing the user established priority rule;
   in response to a user starting to input text to populate an address field of an electronic mail message, identifying records in the virtual address book matching the user's partially inputted text;
   ordering names from the identified records based on the user established priority rule and the information regarding prior interaction with the electronic mail addresses; and
   auto-completing the text being inputted by the user using data from the record identified to have the highest priority with the electronic mail addresses.

2. The method of claim 1, wherein information regarding prior interaction with the electronic mail address comprises:
   the number of messages sent to or received from the electronic mail address.

3. The method of claim 1, wherein information regarding prior interaction with the electronic mail address comprises:
   the date or time that a message was last sent to or received from the electronic mail address.

4. The method of claim 1, wherein information regarding prior interaction with the electronic mail address comprises:
   an indication whether the electronic mail address is part of a conversation thread that the user previously participated in.

5. The method of claim 1, wherein information regarding prior interaction with the electronic mail address comprises:
   an indication whether a message has been shared with the electronic mail address.

6. The method of claim 1, further comprising:
   extracting one or more electronic mail addresses present in one or more address fields of one or more electronic mail messages; and
   comparing each extracted electronic mail address to a list of electronic mail addresses stored in the virtual address book,
   wherein new records are created in the virtual address book for extracted electronic mail addresses not already stored in the virtual address book, and existing records are updated for extracted electronic mail addresses already stored in the virtual address book.

7. The method of claim 6, wherein the one or more address fields comprise one or more of a "From" field, "To" field, "Cc" field, or "Bcc" field.

8. The method of claim 6 wherein extracting further comprises:
   extracting every electronic mail address present in every address field of every electronic mail message transmitted from or received at a predetermined network node.

9. The method of claim 8, wherein the predetermined network node comprises a client terminal or a server.

10. The method of claim 1, wherein each record stored in the virtual address book comprises one or more of a "recently sent to" field, "frequently sent to" field, "recently received" field, "frequently received from" field, "shared thread with" field, or "participated in thread with" field.

11. The method of claim 1, further comprising:
   enabling a user to filter records in the virtual address book, via a graphical user interface, based on one or more of the fields comprising each record.

12. The method of claim 1, further comprising:
   enabling a user to assign priority rules to fields comprising each record, wherein the priority rules are utilized to govern the process of auto-completing text.

13. The method of claim 1, wherein receiving the user request to establish the priority rule comprises:

allowing the user to select the order of the plurality of fields, such that certain fields are assigned a higher priority when auto-completing text.

14. A non-transitory computer readable storage medium having computer readable instructions embodied thereon, the instructions operable when executed by a processor to facilitate auto-completion of text in an address field of electronic mail addresses, the instructions comprising:

a virtual address book configured to store records for electronic mail addresses, the records comprising a plurality of fields, the plurality of fields including:
  i) an electronic mail address;
  ii) a name associated with the electronic mail address; and
  iii) information regarding prior interaction with the electronic mail address;
an address filter module configured to:
  receive a request from a user, via a user interface, to establish a priority rule for ordering records, wherein establishing the priority rule includes receiving a selection from the user of at least one field corresponding to the information regarding prior interaction with the electronic mail address for which a higher priority is assigned to for ordering records; and
an auto-completion module configured to:
  in response to a user starting to input text to populate an address field of an electronic mail message, identify records in the virtual address book matching the user's partially inputted text;
  order names from the identified records based on the user established priority rule and the information regarding prior interaction with the electronic mail addresses; and
  auto-complete the text being inputted by the user using data from the record identified to have the highest priority with the electronic mail addresses.

15. The non-transitory computer readable storage medium of claim 14, wherein the instructions further comprise an address filter module configured to:
  extract one or more electronic mail addresses present in one or more address fields of one or more electronic mail messages; and
  compare each extracted electronic mail address to a list of electronic mail addresses stored in the virtual address book,
  wherein new records are created in the virtual address book for extracted electronic mail addresses not already stored in the virtual address book, and existing records are updated for extracted electronic mail addresses already stored in the virtual address book.

16. The non-transitory computer readable storage medium of claim 15, wherein the one or more address fields comprise one or more of a "From" field, "To" field, "Cc" field, or "Bcc" field.

17. The non-transitory computer readable storage medium of claim 15, wherein extracting the one or more electronic mail addresses present in the one or more address fields of the one or more electronic mail messages further comprises:
  extracting every electronic mail address present in every address field of every electronic mail message transmitted from or received at a predetermined network node.

18. The non-transitory computer readable storage medium of claim 14, wherein the address filter module is configured to enable a user to filter records in the virtual address book, via a graphical user interface, based on one or more of the fields comprising each record.

19. The non-transitory computer readable storage medium of claim 14, wherein the address filter module is configured to enable a user to assign priority rules to fields comprising each record, and wherein the priority rules are utilized to govern the process of auto-completing text.

20. A computer-implemented system configured to facilitate auto-completion of text in an address field of electronic mail addresses, the system comprising:
a processor configured to:
  access, from a memory, a virtual address book comprising records for electronic mail addresses, the records comprising a plurality of fields, the plurality of fields including:
    i) an electronic mail address;
    ii) a name associated with the electronic mail address; and
    iii) information regarding prior interaction with the electronic mail address;
  receive a request from a user, via a user interface, to establish a priority rule for ordering records, wherein establishing the priority rule includes receiving a selection from the user of at least one field corresponding to the information regarding prior interaction with the electronic mail address for which a higher priority is assigned to for ordering records;
  in response to a user starting to input text to populate an address field of an electronic mail message, identify records in the virtual address book matching the user's partially inputted text;
  order names from the identified records based on the user established priority rule and the information regarding prior interaction with the electronic mail addresses; and
  auto-complete the text being inputted by the user using data from the record identified to have the highest priority with the electronic mail addresses.

* * * * *